US012163358B1

(12) United States Patent
Wilkerson

(10) Patent No.: US 12,163,358 B1
(45) Date of Patent: Dec. 10, 2024

(54) RESTRAINT CLIPS

(71) Applicant: Shaun Wilkerson, River Ridge, LA (US)

(72) Inventor: Shaun Wilkerson, River Ridge, LA (US)

( * ) Notice: Subject to any disclaimer, the term of this patent is extended or adjusted under 35 U.S.C. 154(b) by 635 days.

(21) Appl. No.: 17/459,194

(22) Filed: Aug. 27, 2021

Related U.S. Application Data

(60) Provisional application No. 63/071,088, filed on Aug. 27, 2020.

(51) Int. Cl.
*E05B 75/00* (2006.01)
*E05B 67/00* (2006.01)

(52) U.S. Cl.
CPC ............ *E05B 75/00* (2013.01); *E05B 67/006* (2013.01); *E05B 75/005* (2013.01)

(58) Field of Classification Search
CPC .... E05B 75/00; E05B 75/0005; E05B 67/006; E05B 75/005; Y10T 70/404; Y10T 70/402
See application file for complete search history.

(56) References Cited

U.S. PATENT DOCUMENTS 136,419 A * 3/1873 Craig et al. ............. E05B 75/00 70/17
465,069 A * 12/1891 Reid .................... A01K 15/003 119/806
491,642 A * 2/1893 Griffith ................ A01K 15/003 119/806
829,197 A * 8/1906 Manacle ................. E05B 75/00 70/17
885,811 A * 4/1908 Ward ...................... E05B 75/00 70/17
1,014,118 A * 1/1912 Carberry ................ E05B 75/00 70/16
1,017,955 A * 2/1912 Carney ................... E05B 75/00 232/41 R
1,116,329 A * 11/1914 Russell ................... E05B 75/00 70/17
1,147,423 A * 7/1915 Murphy .................. E05B 75/00 70/17
1,157,135 A * 10/1915 Wesson et al. ......... E05B 75/00 70/52
1,197,549 A * 9/1916 Russell ................... E05B 75/00 70/17
1,199,100 A * 9/1916 Murphy .................. E05B 75/00 70/17
1,505,660 A * 8/1924 Moersch ................. E05B 75/00 70/17
1,570,458 A * 1/1926 Cederlof ................. E05B 75/00 70/17

(Continued)

FOREIGN PATENT DOCUMENTS

EP 2341310 7/2011

*Primary Examiner* — Christine M Mills
*Assistant Examiner* — Faria F Ahmad
(74) *Attorney, Agent, or Firm* — Garvey, Smith & Nehrbass, Patent Attorneys, L.L.C.; Julie Rabalais Chauvin; Julia M. FitzPatrick

(57) ABSTRACT

The apparatus of the present invention is a device designed for quick and non-violent apprehension and immobilization of suspects and/or prisoners consisting of two quick connect ankle cuffs joined by a retractable cable, thus enabling law enforcement a method for violent-free restraint.

18 Claims, 6 Drawing Sheets

(56) References Cited

U.S. PATENT DOCUMENTS

| | | | | | |
|---|---|---|---|---|---|
| 1,634,114 | A * | 6/1927 | Murphy | E05B 75/00 70/455 |
| 1,780,473 | A * | 11/1930 | Gill | E05B 75/00 70/16 |
| 1,881,577 | A * | 10/1932 | Hillyard | E05B 75/00 70/16 |
| 1,950,757 | A * | 3/1934 | Smith-Stange | E05B 75/00 119/806 |
| 2,066,654 | A * | 1/1937 | Smith-Stange | E05B 75/00 70/17 |
| 2,949,761 | A * | 8/1960 | Mitchell | E05B 75/00 128/879 |
| 4,404,822 | A * | 9/1983 | Green | E05B 67/006 224/935 |
| 4,530,310 | A * | 7/1985 | Clarke | A01K 27/005 463/47.4 |
| 4,543,806 | A * | 10/1985 | Papandrea | E05B 67/006 242/380 |
| 5,099,662 | A | 3/1992 | Tsai | |
| 5,230,351 | A * | 7/1993 | Nyorkor | E05B 75/00 128/878 |
| 5,400,623 | A | 3/1995 | Bota | |
| 5,469,813 | A | 11/1995 | Peden | |
| 5,482,271 | A * | 1/1996 | McNutt | A01K 97/14 119/808 |
| 5,555,751 | A * | 9/1996 | Strickland | E05B 75/00 70/16 |
| 5,680,781 | A * | 10/1997 | Bonds | E05B 75/00 70/17 |
| 5,752,416 | A * | 5/1998 | Nien | E05B 67/003 74/551.8 |
| 6,026,661 | A | 2/2000 | Spiropoulos | |
| 6,092,402 | A * | 7/2000 | Porcelli | A63C 11/005 70/58 |
| 6,550,293 | B1 * | 4/2003 | Delegato | E05B 69/00 211/4 |
| 7,210,317 | B2 | 5/2007 | Beane et al. | |
| 8,230,706 | B1 * | 7/2012 | Amo | E05B 75/00 70/17 |
| 8,307,676 | B2 | 11/2012 | Irisawa | |
| 8,595,904 | B2 | 12/2013 | Klementowicz, III et al. | |
| 8,607,742 | B2 * | 12/2013 | Lash | F41H 13/0018 119/796 |
| 8,904,832 | B1 * | 12/2014 | Rodriguez | E05B 75/00 70/16 |
| 9,038,426 | B2 | 5/2015 | Flynn | |
| 9,828,791 | B2 * | 11/2017 | Lash | F41H 13/0018 |
| 10,036,184 | B1 * | 7/2018 | Sims | A01K 15/04 |
| D828,961 | S | 9/2018 | Moore | |
| 10,260,832 | B2 * | 4/2019 | Bowe, Jr. | E05B 19/00 |
| 11,054,063 | B2 * | 7/2021 | Ratzlaff | F16L 3/1075 |
| 11,293,203 | B2 * | 4/2022 | Rak | E05B 75/00 |
| 11,479,994 | B1 * | 10/2022 | Conley | E05B 75/00 |
| 11,920,383 | B2 * | 3/2024 | Bryan | E05B 75/00 |
| 2007/0000451 | A1 * | 1/2007 | Goto | F41B 15/02 119/802 |
| 2008/0047307 | A1 | 2/2008 | Kenney | |
| 2008/0173048 | A1 | 7/2008 | Kim et al. | |
| 2010/0018263 | A1 * | 1/2010 | Ben Yehuda | E05B 75/00 70/275 |
| 2011/0126597 | A1 * | 6/2011 | Irisawa | F41B 15/02 70/16 |
| 2012/0085135 | A1 * | 4/2012 | Louden | E05B 75/00 70/16 |
| 2013/0133382 | A1 * | 5/2013 | Thompson | E05B 75/00 70/431 |
| 2013/0145994 | A1 * | 6/2013 | Lash | A01K 27/009 119/796 |
| 2013/0333425 | A1 * | 12/2013 | Krelle | E05B 75/00 70/16 |
| 2016/0083980 | A1 * | 3/2016 | Lash | A01K 27/009 70/17 |
| 2018/0320417 | A1 * | 11/2018 | Sims | A01K 15/04 |
| 2019/0338566 | A1 * | 11/2019 | Sims | A01K 15/04 |
| 2022/0018164 | A1 * | 1/2022 | Walwer | E05B 75/005 |
| 2024/0044180 | A1 * | 2/2024 | Foy | G01R 33/288 |

* cited by examiner

RESTRAINT CLIPS

CROSS-REFERENCE TO RELATED APPLICATIONS

This application claims the benefit of U.S. Provisional Patent Application Ser. No. 63/071,088, filed on 27 Aug. 2020, which is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to restraint clips for use in suspect or prisoner restraint, such as by law enforcement or security officers. More particularly, the present invention relates to a restraining device for use on the ankles of a prisoner or suspect.

2. General Background of the Invention

Various methods and devices have been used to retrain and prevent escape of prisoners and suspects by law enforcement and security officers. However, the currently available restraint mechanisms often cause damage or injury to those being restrained, and also put the law enforcement personnel using them in danger when attempting to use them on a suspect or prisoner. Thus, there exists a need for a restraining device that will not cause injury to the prisoner or suspect and allows a law enforcement officer to place the device on the suspect or prisoner without putting himself or herself in harm's way.

The following U.S. Patents and Publications are incorporated herein by reference:

U.S. Pat. Nos. D828,961; 5,099,662; 5,400,623; 5,469,813; 6,026,661; 7,210,317; 8,307,676; 8,595,904; 9,038,426; 2008/0047307; and 2008/0173048.

BRIEF SUMMARY OF THE INVENTION

The apparatus of the present invention is a device designed for quick and non-violent apprehension and immobilization of suspects and/or prisoners consisting of two quick connect ankle cuffs joined by a retractable cable, thus enabling law enforcement a method for violent-free restraint.

The restraining apparatus preferably comprises a pair of cuffs and a retractable cable. Preferably, each cuff has a pair of spring-loaded arms allowing the cuff to be pushed onto a person's ankle, and a back hinge joint that allows the cuff to open completely. Preferably, the pair of cuffs are attached to one another with the retractable cable. The cuffs have a closed position when both the back hinge joint and spring-loaded arms are closed, an open position when the back hinge joint is open, and a push position the spring-loaded arms are open. Preferably, the cable has a spring mechanism in the center that causes the cable to automatically retract when both cuffs are in the closed position. Preferably, the spring-loaded arms have spring-loaded hinges that allow them to close automatically when pushed onto a person's ankle.

In some preferred embodiments, the apparatus further comprises a pair of rods that attach one rod to each of the pair of cuffs when the cuffs are in the open or push position. Preferably, the rod is telescoping, and includes a handle with finger grips and a trigger to release the rod from the cuff. Preferably the handle is at the opposite end of the rod from the cuff.

In some preferred embodiments the spring-loaded arms are able to rotate a full 360 degrees through a hollow portion of the cuffs. In this embodiment, the arms preferably can only rotate in one direction.

The present invention also includes a method of preventing escape of a person using the apparatus of present invention. The method includes pushing the pair of cuffs onto a person's ankles, from the push position, causing the cuffs to close around the persons ankles in the closed position. This causes the cable to retract completely preventing further ambulation of person. Where the cuffs are equipped with the rod, the rod can be used to push the cuff onto the person's ankles allowing apprehension without getting closer to the suspect than necessary.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
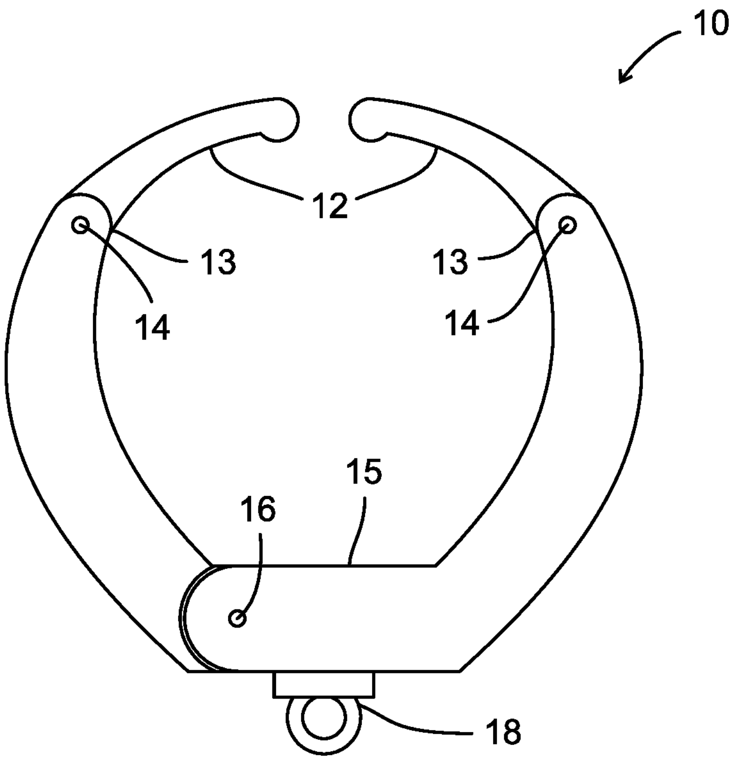
FIG. 1 is a top view one ankle cuff of a preferred embodiment of the present invention in a closed position.
Figure 2:
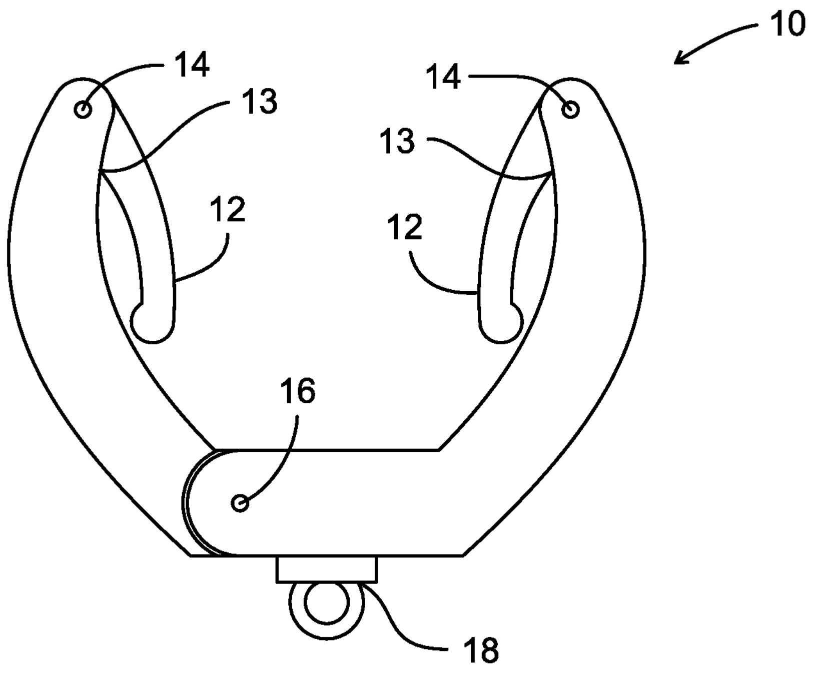
FIG. 2 is a top view one ankle cuff of a preferred embodiment of the present invention in an open position.
Figure 3:
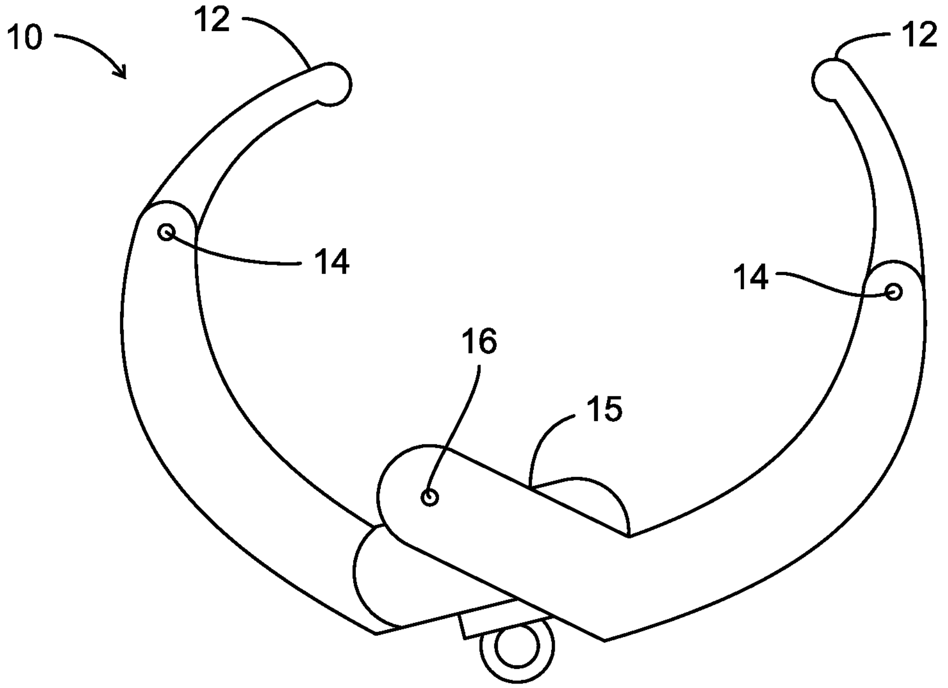
FIG. 3 is a top view one ankle cuff of a preferred embodiment of the present invention in an unlatched and open position.
Figure 4:
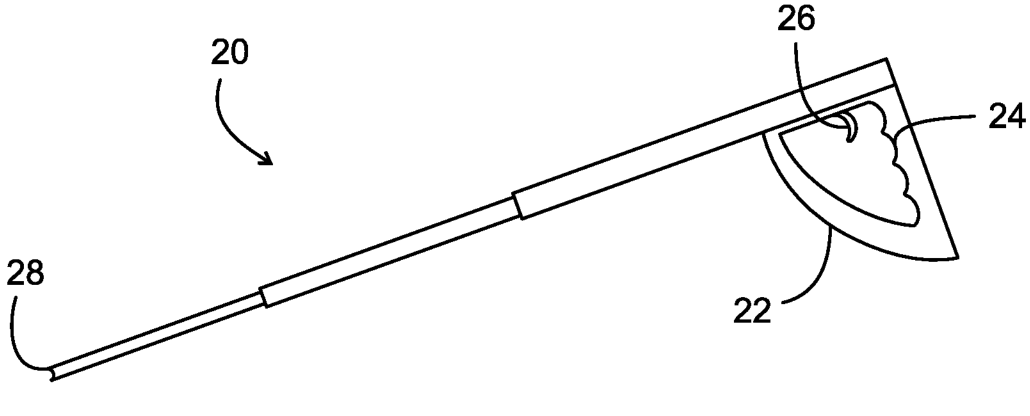
FIG. 4 is a top view of the rod of a preferred embodiment of the present invention.
Figure 5:
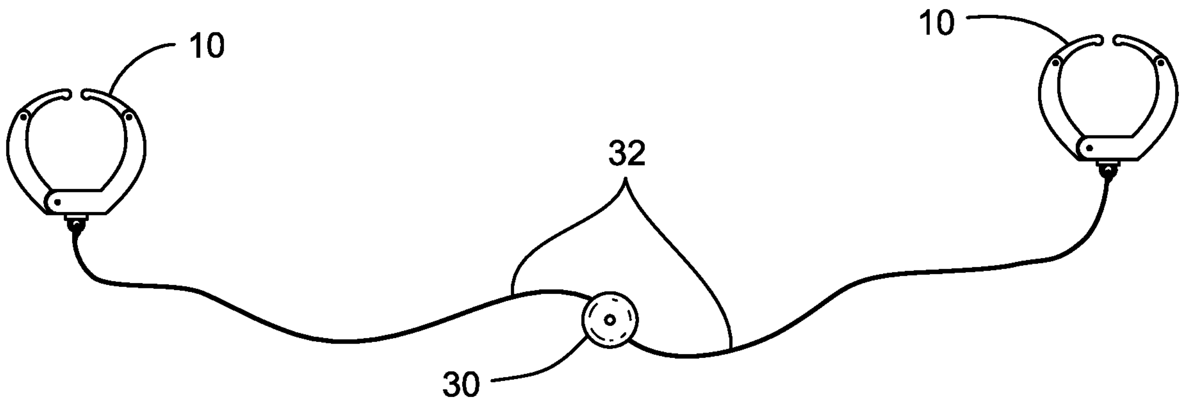
FIG. 5 is a top view of the apparatus of the present invention.

The apparatus of the present invention is preferably comprised of at least two separate components. Preferably, one component is a matching set of two preferably spring-loaded cuffs 10. Preferably, the cuffs 10 are made of a material suitable for restraining a human suspect or prisoner. For example, the cuffs 10 can be made of reinforced plastic, aluminum, or other lightweight metals, such as titanium or magnesium; however, any suitable materials could be used. Preferably, the cuffs 10 have a diameter 11 suitable for encompassing a human ankle when in the closed position shown in FIG. 1. More preferably, this diameter 11 is about 6 inches; most preferably, this diameter 11 is 4 inches. However, other suitable sizes of cuffs may be used, including those suitable for ankles and wrists of males, females, and juveniles. Preferably, the cuffs 10 are used on a suspect's ankles, though they could also be used on a suspect's wrists. One of these cuffs 10 can be seen in FIGS. 1-3. Preferably, the apparatus of the present invention comprises a set of two of these cuffs 10 as shown in FIG. 5. Preferably, the cuffs 10 are padded (not shown). Preferably, the cuffs 10 can be clipped to a suspect's ankles simply by pushing the device to the ankles. FIG. 2 shows the cuff 10 in its push position as if to push onto a suspect's ankle, wherein the spring-loaded arms 12 are open at front hinge 13, and the back hinge 15 is closed. Two spring-loaded arms 12 can preferably push inward at front hinge 13 about cuff pins 14 allowing the cuff 10 to surround an ankle or wrist. Preferably, there is a front hinge 13, that is preferably spring-loaded so that the arms 12 automatically close around the ankle or wrist. This reduces the time and effort required to cuff a suspect. Preferably, the cuffs 10 are also hinged at back hinge 15 and can be opened by a keyed release at connection 18, using keyhole for unlocking mechanism 16. Preferably, connection 18 is a ball/socket connection. FIG. 3 shows the cuff 10 open at hinge 15. This keyed release simplifies releasing the cuffs 10 from the suspect. Preferably, the ankle cuffs 10 each have a preferably telescoping rod 20 on their ends. A preferred embodiment of this rod 20 is shown in FIG. 4. Preferably, the rod is of a length suitable to allow a user to place the cuffs 10 on a suspect's or prisoner's ankles without the user placing him or herself in harm's way. For example, the rod could be 4-6 feet in length, preferably, 2-4 feet in length, and most preferably, 1-3 feet in length.

Preferably, the rod is made of reinforced plastic, aluminum, or other lightweight metals, such as titanium or magnesium; however any suitable materials could be used. Preferably, this rod 20 has a handle guard 22 on the end. Preferably, the handle has handle grip 24 and a trigger release 26. The rod 20 can be attached to the cuff 10 at connectors 28 and 18 by any number of methods, including ball and socket joint (as shown), trigger release system, or other suitable means. Preferably, immediately upon cuffing the suspect, the rods 20 can be programmed to release from the cuff 10. In some preferred embodiments, the rod 20 can be released by a trigger 26 at the handle 22.

Figure 6:
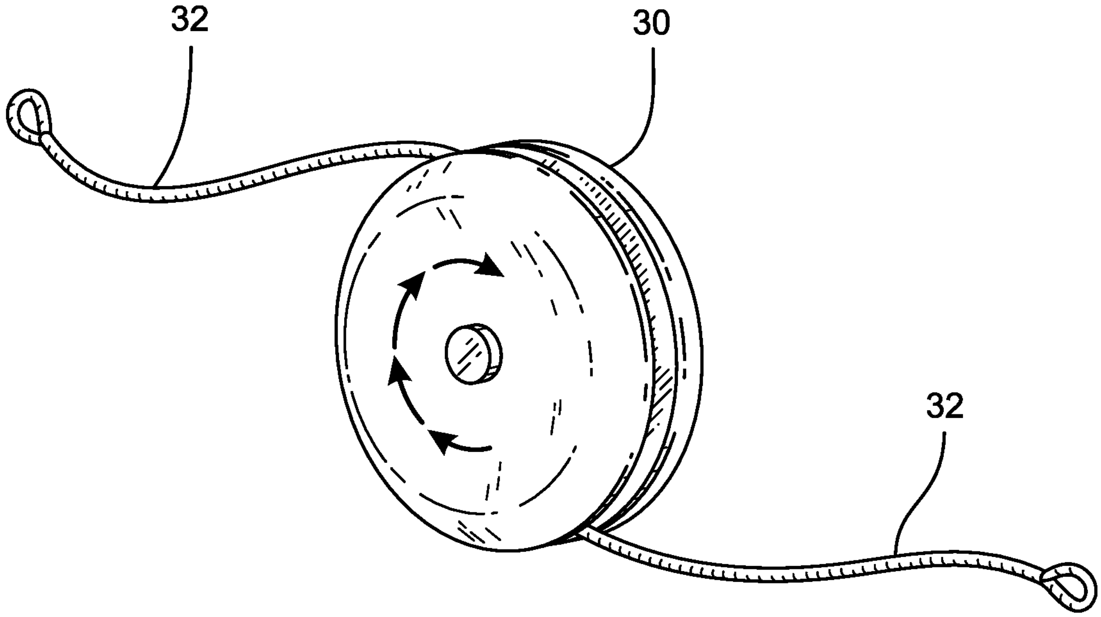
FIG. 6 is a side, perspective view of a preferred embodiment of a spring and cable device of the present invention.

Preferably, another component of the present invention is a connecting cable 32 attached to each cuff 10 as shown in FIGS. 5 and 6. Preferably, the cable is a vinyl-coated steel cable; however, any suitable material could be used. Preferably, the cable 32 is about 48 inches in length, more preferably it is about 32 inches in length, and most preferably, it is about 22 inches in length; however, any suitable length could be used. The cable 32 preferably has a concentric spring-loaded retractor 30 in the middle which is programmed to activate the spring once the two cuffs 10 are applied (see FIG. 5). Preferably, spring-loaded retractor 30 uses constant coil spring and yawl stops. Self-retracting lifeline mechanisms similar to those found on industrial safety harness devices are also a possibility for joining the two cuffs 10 together. Preferably, the spring-loaded retraction device 30 is 2-4 inches in diameter, more preferably, it is 3 inches in diameter, and most preferably 2.5 inches in diameter; however, any suitable diameter could be used.

Preferably, the spring-loaded retractor 30 is constantly set to retract once both cuffs 10 are applied. In the "relaxed" position shown in FIG. 5, the full extension of the cable is preferably approximately 20-24 inches. Once activated the cables 32 preferably retract fully, bringing the suspect's ankles together. (This activated position of the cable is not shown in the figures). During non-confrontational arrests, the spring 30 can preferably be disabled. Preferably, the spring is disabled remotely by a Bluetooth device or other suitable remote control device, thus rendered inactive to retract, thus enabling the suspect to walk comfortably. If a suspect is cuffed in the "relaxed" position and then attempts to escape by running, the Bluetooth device can preferably be quickly activated by the arresting officer, rendering the suspect unable to continue on foot.

Figure 7:
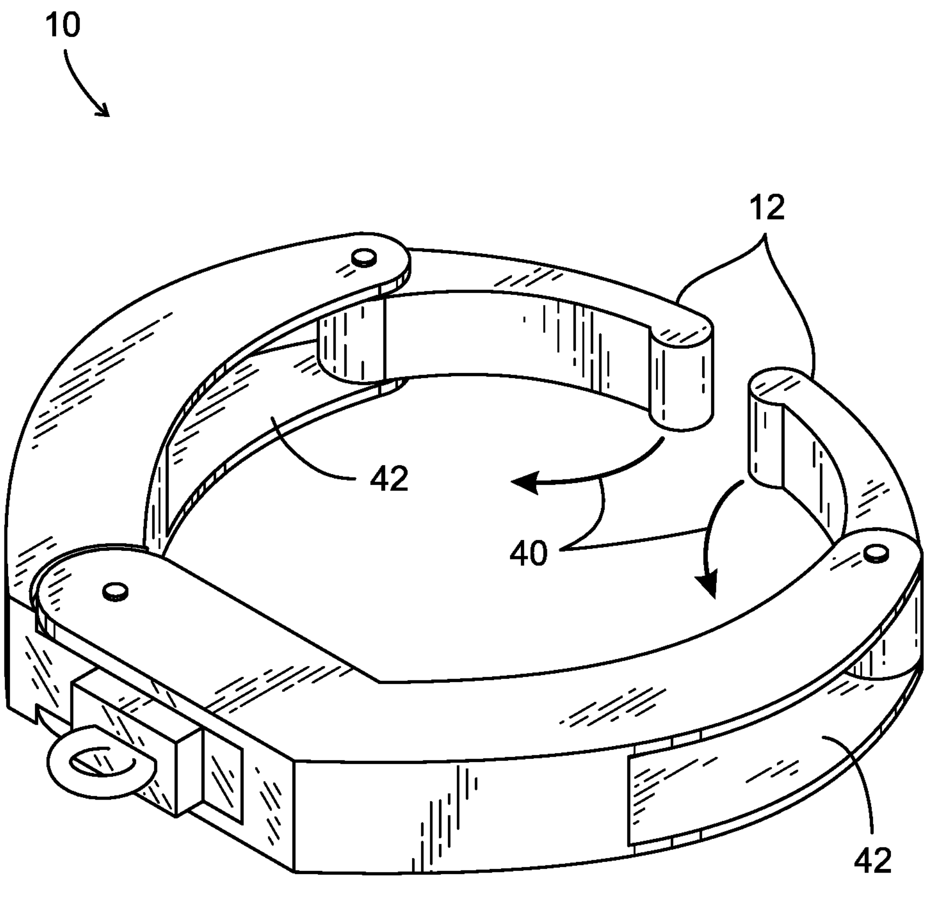
FIG. 7 is a top, perspective view of a preferred embodiment of the cuff of the present invention.
Figure 8:
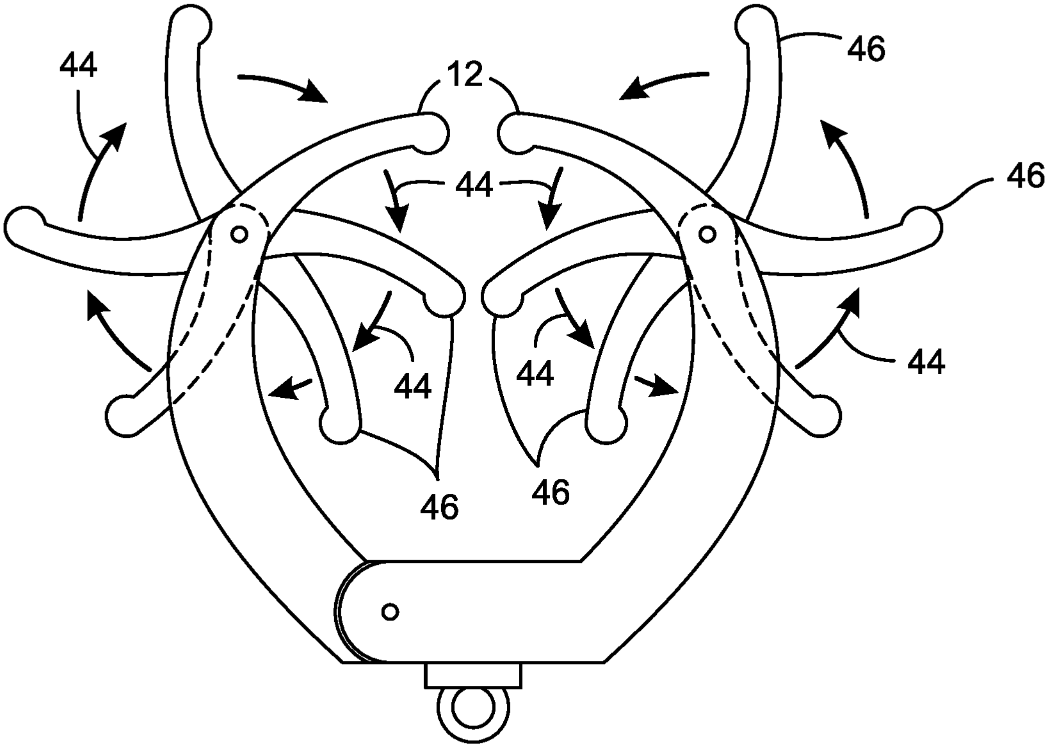
FIG. 8 is top view of a preferred embodiment of the cuff of the present invention.
Figure 9:
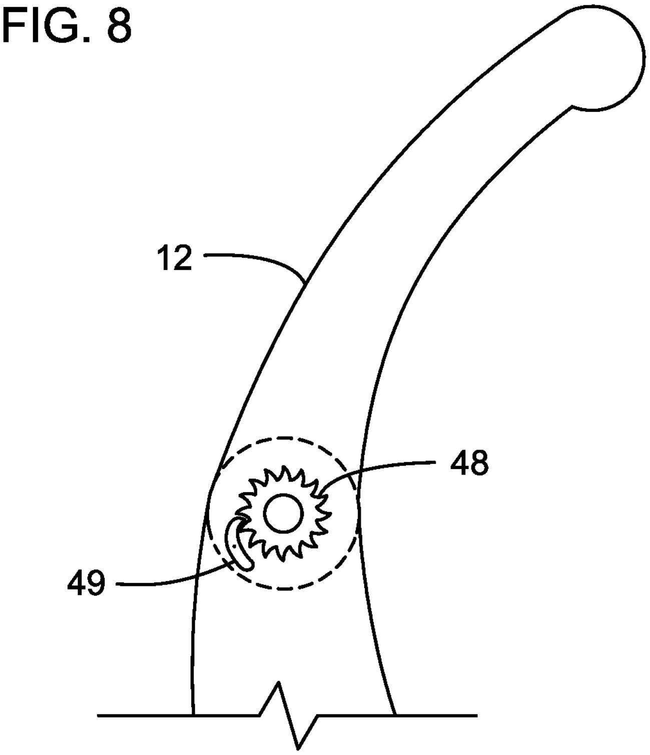
FIG. 9 is close-up view of the release arm of a preferred embodiment of the cuff of the present invention.

In a preferred embodiment of the present invention, the spring-loaded arms 12 are solid and are able to passthrough hollow sections 42 of the clamp arms as shown in FIG. 7. In this embodiment, the arms 12 are able to pass through in a 360-degree arc as shown by arrows 44 and arms 46 in FIG. 8. Additionally, the arms 12 preferably have a concentric ratchet 48 with a pawl 49 contained inside, limiting the arm 12 to a one-way motion as shown in FIG. 9. This design renders the cuffs 10 incapable of being pulled open by the prisoner.

Figure 10:
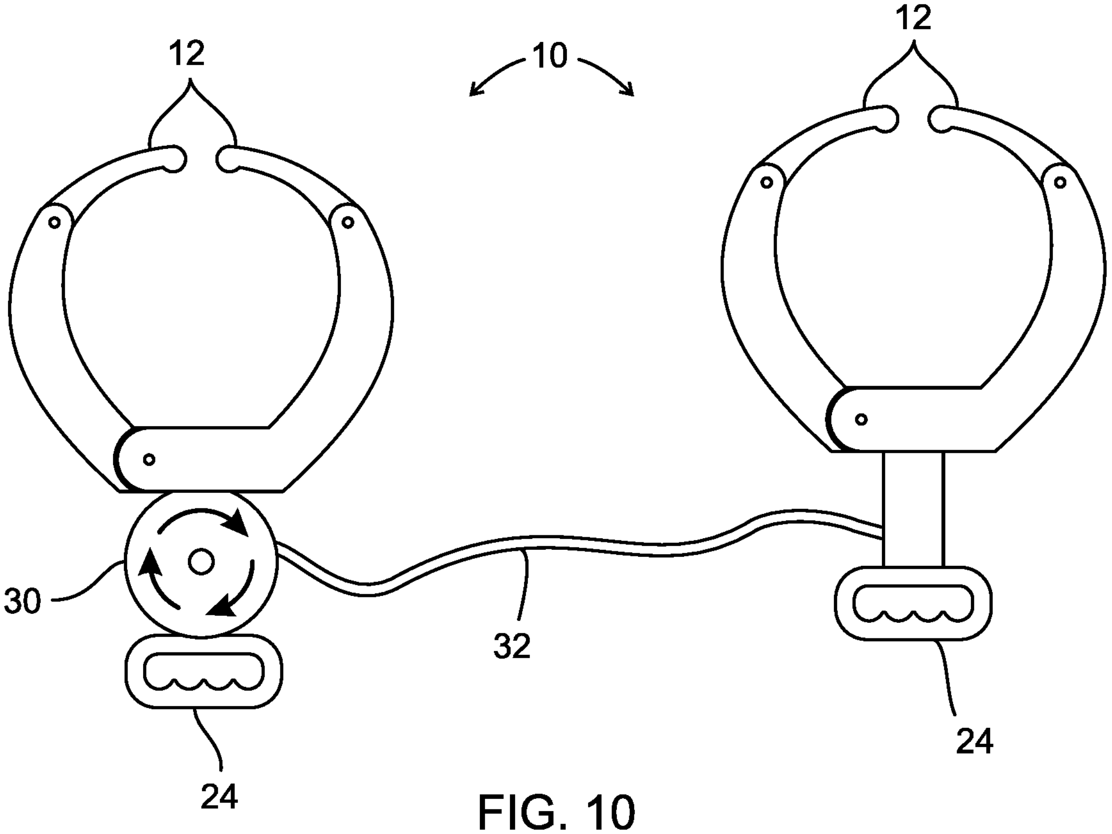
FIG. 10 is a top view of a preferred embodiment of the present invention.

In a preferred embodiment, the spring ratcheting device 30 is connected to one of the cuffs 10, the reducing the possibility of tangling, as shown in FIG. 10.

PARTS LIST

The following is a list of parts and materials suitable for use in the present invention:

Parts Number Description

- 10 cuff, preferably an ankle cuff
- 11 diameter of cuff
- 12 spring-loaded arm
- 13 front hinge
- 14 cuff pin
- 15 back hinge
- 16 keyhole for unlocking the mechanism
- 18 connection, preferably ball/socket connection
- 20 rod, preferably telescoping
- 22 handle guard
- 24 handle grip
- 26 trigger release
- 28 connector, preferably socket connector
- 30 spring-loaded retractor
- 32 cable connector to cuff
- 40 arrows
- 42 hollow section of cuff
- 44 arrow showing 360° movement of arm
- 46 arm sections showing 360° movement of arm
- 48 ratchet
- 49 pawl All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A restraining apparatus comprising:

a pair of cuffs able to be positioned on a person's ankles; and a cable that is retractable;

wherein each cuff has a pair of spring-loaded arms allowing each cuff to be pushed onto one said ankle, and a back hinge joint allowing each cuff to open completely;

wherein the pair of cuffs are attached to one another with the cable;

wherein the pair of cuffs have a closed position when both the back hinge joint and spring-loaded arms are closed, an open position when the back hinge joint is open, and a push position when the spring-loaded arms are open; and wherein the pair of spring-loaded arms have spring-loaded hinges that allow them to close automatically when pushed onto the person's ankles.

2. The restraining apparatus of claim 1 wherein the cable has a spring mechanism in the center that causes the cable to automatically retract when both cuffs are closed at the back hinge and the spring-loaded arms.

3. The restraining apparatus of claim 1 wherein the cable is between 20 and 24 inches long.

4. The restraining apparatus of claim 1 wherein the pair of cuffs have padding on the inside.

5. The restraining apparatus of claim 1 further comprising a pair of rods that attach one rod to each of the pair of cuffs when the pair of cuffs are in the open or push position.

6. The restraining apparatus of claim 5 wherein each rod is telescoping.

7. A restraining apparatus comprising:

a pair of cuffs able to be positioned on a person's ankles; and a cable that is retractable;

a pair of rods that attach one of the pair of rods to one of the pair of cuffs when the pair of cuffs are in the open or push position;

wherein each cuff has a pair of spring-loaded arms allowing each cuff to be pushed onto one said ankle, and a back hinge joint allowing each cuff to open completely;

wherein the pair of cuffs are attached to one another with the cable;

wherein the pair of cuffs have a closed position when both the back hinge joint and spring-loaded arms are closed, an open position when the back hinge joint is open, and a push position when the spring-loaded arms are open; and wherein each rod has a handle with finger grips and a trigger to release one said rod from one said cuff.

8. A method of preventing escape of a person using the restraining apparatus of claim 1, the method comprising the following steps:

(a) pushing the pair of cuffs onto the person's ankles;

(b) retracting the cable completely, preventing further ambulation of the person.

9. A method of preventing escape of a person using the restraining apparatus of claim 7, the method comprising the following steps:

(a) using the pair of rods to push the pair of cuffs onto the person's ankles;

(b) pressing the trigger to release the pair of rods from the pair of cuffs;

(c) retracting the cable completely, preventing further ambulation of the person.

10. A restraining apparatus comprising:

a pair of cuffs able to be positioned on a person's ankles; and a cable that is retractable;

wherein each cuff has a pair of spring-loaded arms allowing each cuff to be pushed onto one said ankle, and a back hinge joint allowing each cuff to open completely;

wherein the pair of cuffs are attached to one another with the cable;

wherein each cuff has a closed position when both the back hinge joint and spring-loaded arms are closed, an open position when the back hinge joint is open, and a push position when the pair of spring-loaded arms are open; and wherein the pair of spring-loaded arms are able to rotate 360° through a hollow portion of the pair of cuffs.

11. The restraining apparatus of claim 10, wherein the pair of spring-loaded arms further comprise a ratchet and pawl that prevents said spring-loaded arms from rotating in one direction.

12. The restraining apparatus of claim 10, wherein the pair of cuffs have padding on the inside.

13. The restraining apparatus of claim 10, wherein the cable is between 20 and 24 inches long.

14. The restraining apparatus of claim 10, further comprising a pair of rods that attach one rod to each of the pair of cuffs when the pair of cuffs are in the open or push position.

15. The restraining apparatus of claim 14 wherein each said rod is telescoping.

16. The restraining apparatus of claim 15 wherein each said rod has a handle with finger grips and a trigger to release one said rod from one said cuff.

17. A method of preventing escape of a person using the restraining apparatus of claim 16, the method comprising:

(a) using the pair of rods to push the pair of cuffs onto the person's ankles;

(b) pressing the trigger to release the pair of rods from the pair of cuffs; and (c) retracting the cable completely, preventing further ambulation of the person.

18. The method of claim 17 wherein the pair of cuffs are padded.

* * * * *